(12) United States Patent
Carro

(10) Patent No.: US 7,962,842 B2
(45) Date of Patent: Jun. 14, 2011

(54) METHOD AND SYSTEMS FOR ACCESSING DATA BY SPELLING DISCRIMINATION LETTERS OF LINK NAMES

(75) Inventor: Fernando-Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 11/351,078

(22) Filed: Feb. 9, 2006

(65) Prior Publication Data
US 2006/0271838 A1 Nov. 30, 2006

(30) Foreign Application Priority Data

May 30, 2005 (EP) ..................................... 05104623

(51) Int. Cl.
*G06N 3/00* (2006.01)
(52) U.S. Cl. .......................... 715/205; 715/206; 715/234
(58) Field of Classification Search .................. 715/234, 715/243, 254, 205, 206
See application file for complete search history.

(56) References Cited

U.S. PATENT DOCUMENTS

| | | | |
|---|---|---|---|
| 4,701,851 A | 10/1987 | Bass et al. | |
| 5,890,123 A | 3/1999 | Brown et al. | |
| 5,983,244 A | 11/1999 | Nation | |
| 6,101,472 A * | 8/2000 | Giangarra et al. | ............ 704/275 |
| 6,304,844 B1 | 10/2001 | Pan et al. | |
| 6,321,196 B1 | 11/2001 | Franceschi | |
| 6,400,806 B1 | 6/2002 | Uppaluru | |
| 6,408,270 B1 | 6/2002 | Garber | |
| 6,687,673 B2 | 2/2004 | Mann | |
| 6,721,702 B2 | 4/2004 | Schneider | |
| 6,771,283 B2 | 8/2004 | Carro | |
| 6,771,743 B1 | 8/2004 | Butler et al. | |
| 7,067,534 B1 * | 6/2006 | Marzabadi et al. | ............ 514/323 |
| 2002/0049781 A1 | 4/2002 | Bengtson | |
| 2002/0184035 A1 | 12/2002 | Hartley et al. | |
| 2003/0149565 A1 | 8/2003 | Chang et al. | |
| 2003/0152293 A1 | 8/2003 | Bresler et al. | |
| 2004/0109026 A1 | 6/2004 | Kessenich et al. | |
| 2004/0122848 A1 * | 6/2004 | Toivonen et al. | ............. 707/102 |

(Continued)

OTHER PUBLICATIONS

BBC—Languages—Your say. http://www.bbc.co.uk/languages/yoursay, United Kingdom, Printed Sep. 13, 2005.

(Continued)

*Primary Examiner* — Kyle R Stork
(74) *Attorney, Agent, or Firm* — Karuna Ojanen; Ojanen Law Offices

(57) ABSTRACT

A method for marking hyperlinks, for creating an associated link spelling table, and for accessing the address of a marked hyperlink. A portion of text is selected and the hyperlinks of the selected text are identified. Then a link spelling table is created and a set of discrimination letter subsets characterizing each of the identified hyperlink is determined. Each discrimination letter subset is associated to the address of the corresponding hyperlink in the link spelling table, and the discrimination letter subset in each hyperlink of the selected text portion are marked. Then, to access the hyperlink, the user spells the discrimination letters that are then converted to extract the discrimination letter subset. The link spelling table is accessed to determine if the extracted discrimination letter subset belongs to the link spelling table. If the extracted discrimination letter subset belongs to the link spelling table, the address associated with the extracted discrimination letter subset is recovered and the data localized at that address are accessed.

19 Claims, 5 Drawing Sheets

U.S. PATENT DOCUMENTS

2004/0169682 A1     9/2004    Silverbrook et al.
2004/0217160 A1    11/2004    Silverbrook et al.

OTHER PUBLICATIONS

Billi, Roberto, Interview with Roberto Billi, Phones, phonemes and multimodality, The journal of Record for Human Language Technology, 1999, Italy. file:///E/LeJournal/article.asp-articleIndex=628. htm, see also, http://www.hltcentral.org/usr_docs/LeJournal/l-phonesPhonemesmultimodality.pdf.

Bond, Karen, Pronunciation Problems for Brazilian Students of English, Aug. 2001. http://www3.telus.net/linguisticsissues/pronunciation.html.

Ten Bosch, Louis, Cremelie, Nick, Pronunciation Modeling and Lexical Adaptation Using Small Training Sets, at http://www.clsp.jhu.edu/pmla2002/cd/papers/tenbosch.pdf, 2002.

Boves, Lou et al., ASR for Automatic Directory Assistance: The SMADA Project at http://www.lia.univ-avignon.fr/fich_art/LIA-210-asr2000.pdf, 2000.

A Collection of World Oddities and Trivia, p. 7. http://members.aol.com/gulfhigh2/words7.html, Jul. 28, 2005.

A Collection of World Oddities and Trivia, p. 8. http://members.aol.com/gulfhigh2/words8.html, Jun. 24, 2005.

A Collection of Word Oddities and Trivia, p. 10. http://members.aol.com/gulfhigh2/words10.html, Jul. 24, 2005.

A Collection of Word Oddities and Trivia, p. 11. http://members.aol.com/gulfhigh2/words11.html, Sep. 5, 2005.

FAME Project—facilitating Agents in Multicultural Exchange . . . Multiparty Conversation Modelin . . . Robust Multi-lingual Spontaneous Speech Recognition. http://is.cs.cmu.edu/fame/robust.html, Printed Jan. 12, 2006.

German Pronunciation Problems. Die fehlerhafte englische Aussprache der Deutschen. http://www.aeiou.co.uk/]deutschermichel/articles/article-00i01m.htm, Printed Sep. 13, 2005.

Gerosa, Matteo and Giuliani, Diego, Investigating Autojmatmic Recognition of Non-Native Chlidren's Speech at http://pfstar.itc.it/public/publications/itc-Icslp-2004-2.pdf, 2004.

Goronzy, Silke et al., Is Non-Native Pronunciation Modelling Necessary?, 2001.

How Do You Say "Porsche"? Pronounding German Words in English. http://german.about.com/library/weekly/aa020401b.htm, Printed Sep. 13, 2005.

IBM Embedded Via Voice Multiplatform Edition, http://www-306.ibm.com/software/pervasive/embedded_viavoice_multiplatform/about/, Printed Sep. 13, 2005.

Ikeno, Ayako et al., Issues in Recognition of Spanish-Accented Spontaneous English, http://csir.colorado.edu/beginweb/ISCA2003/isca2003.pdf, 1992.

Is it possible to pronounce the divine name if its genuine vowels are not known? http://gertoux.online.fr/divinename/faq/A01.htm, Printed Sep. 13, 2005.

Jacobson, J. et al. The last book, IBM Systems Journal, vol. 36, No. 3, 1997, pp. 457-463. USA.

Kunter, Gero, Pronunciation problems for German learners, UE Introduction to Phonetics/Phonology Philipps-Universitat Marburg, Institut fur Anglistik und Americanistik, 2004.

Levi, Michael, Literature at the Human-Computer Seam, U.S. Department of Labor. http://www.bls.gov/ore/htm_papers/st000100.htm, 2000.

Marx, Matt et al., Reliable spelling despite poor spoken letter recognition, http://www.media.mit.edu/speech/papers/1994/marx_AVIOS94_reliable_spelling.pdf, 1994.

Mitchell, Carl D. et al., Improved Spelling Recognition Using a Tree-based Fast Lexical Match, vol. 2, pp. 597-600 at http://icassp99.asu.edu/technical/sessions/abstracts-SP-19.html, 1999.

Nguyen, Sabrina, Accessibility and Profitability: Voice Recognition Technology, Dec. 2004 at http://ideal-group.org/articles/Voice%20Recognition%20Technology.htm.

Pierehumbert, Janet B., Word-specific phonetics, Jun.24, 2001 at http://babel.ling.northwestern.edu/[tilde]jbp/LP7box/LP7-WoodsHole.pdf.

Pisarn, Chutima et al., Exploiting a Continuous Speech Corpus for Thai Spelling Recognition, at http://www.cs.dal.ca/dcsi/all04papers/036.pdf, 2004.

San-Segundo S. et al., Spanish Recogniser of Continuously Spelled Names over the Telephone at http://www-gth.die.upm.es/[tilde]macias/doc/pubs/icslp2000/submitted/00601.pdf, 2000.

San-Segundo S. et al., Detection of Recognition Errors and Out of the Spelling Dictionary Names in a Spelled Name Recogniser for Spanish at http://www-gth.die.upm.es/[tilde]macias/doc/pubs/eurosp01/reben-spellingoov.pdf, 2001.

Selinker, Larry et al., Interlanguage speech recognition by computer: implications for SLA and computational machines at http://www.solki.ivu.fi/apples/010101/ISPRC.htm, 2001.

Speech Recognition Grammar Specification Version 1.0, W3C Recommendation Mar. 16, 2004 at http://www.w3.org/TR/2004/REC-speech-grammar-20040316/.

Strik, Helmer, Speech is like a box of chocolates . . . 15$^{th}$ ICPhS Barcelona at http://lands.let.ru.nl/literature.strik.2003.1.pdf, 2003.

Waibel, Alexander, Multilingual Speech Processing, at http://cslu.cse.ogi.edu/HLTsurvey/ch8node8.html, Printed Sep. 13, 2005.

Wang, Zhirong et al., Comparison of Acoustic Model Adaptation Techniques on Non-Native Speech, ICASSP 2003 at http://www-2.cs.cmu.edu/[tilde]tanja/Papers/ICASSP03-wang.pdf, 2003.

Pronounciation Problems for Korean Speakers of English, http://myhome.naver.com/englishparum/menu0.php, Printed Sep. 13, 2005.

http://www.junglebook-collection.nl/pmwiki/pmwiki.php/Main/KassHunting, Kaa's Hunting tis the title of the second chapter in Rudyard Kiplings's "The Jungle Book" first published in 1894.

\* cited by examiner

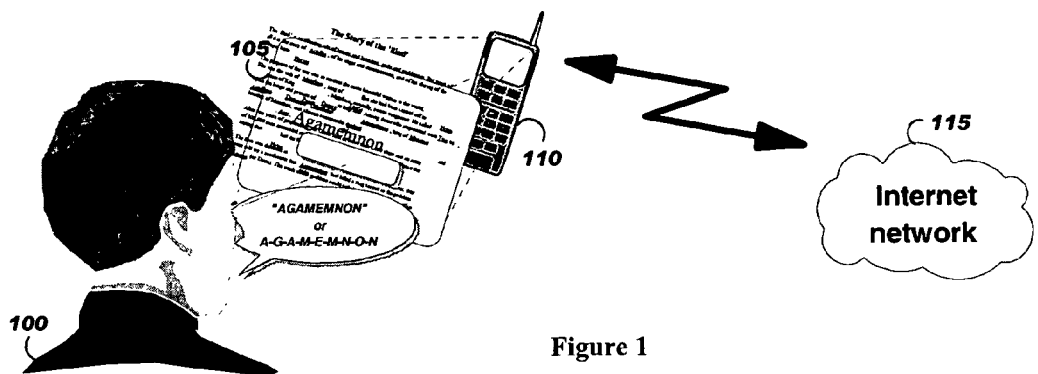
Figure 1
PRIOR ART
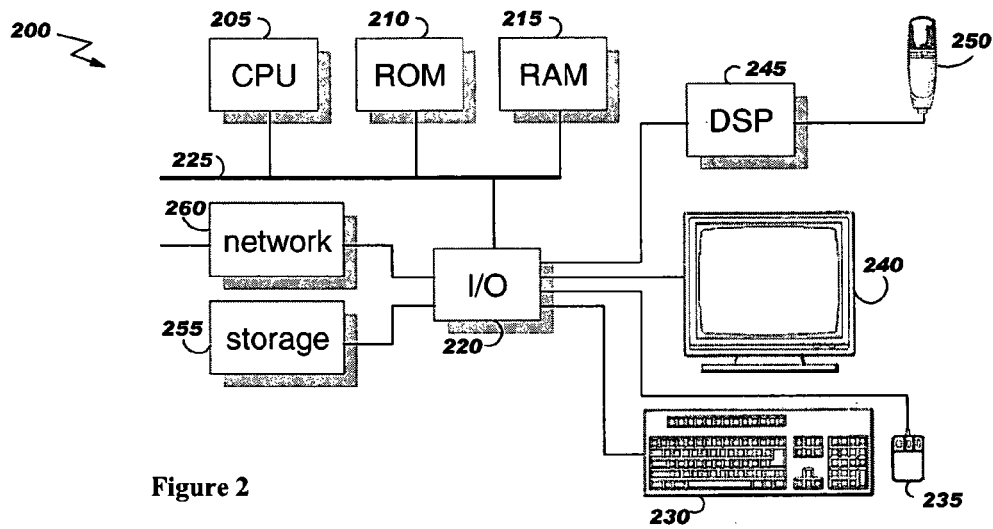
Figure 2
| | 600 | 605 | 610 |
|---|---|---|---|
| | Link name | Spell | Address (or URL) |
| | Achilles | A | http://homepage.mac.com/cparada/GML/Achilles.html |
| | Aeneas | AE | http://www.pantheon.org/articles/a/aeneas.html |
| 615 | ⋮ | ⋮ | ⋮ |
| | Troy | TO | http://homepage.mac.com/cparada/GML/Troy.html |
| | Virgil | V | http://www.kirjasto.sci.fi/virgil.htm |
Figure 6

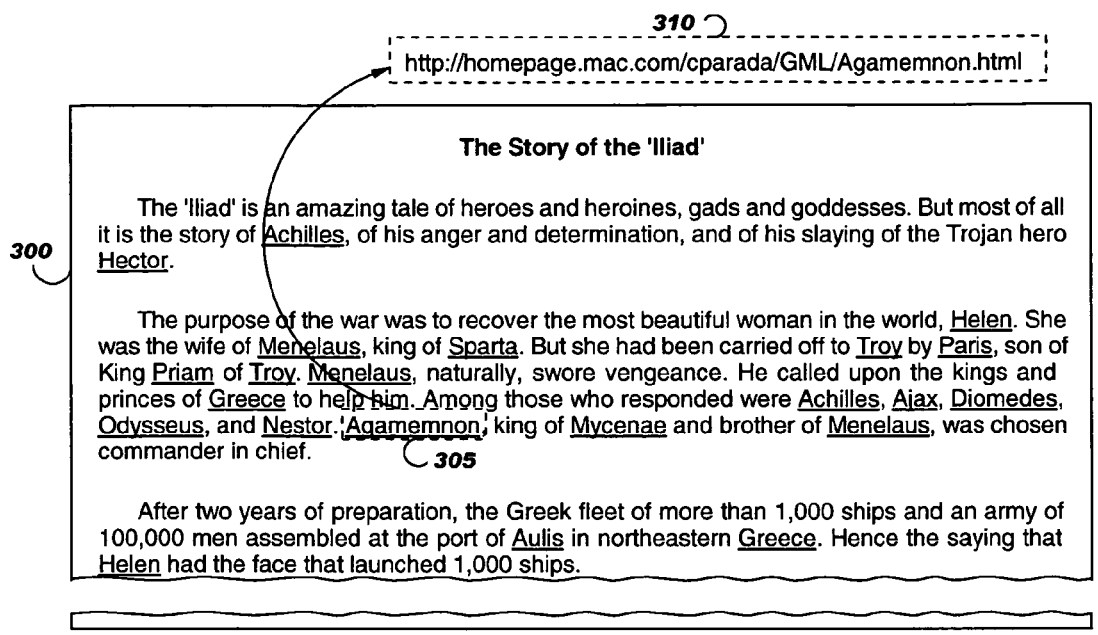
Figure 3
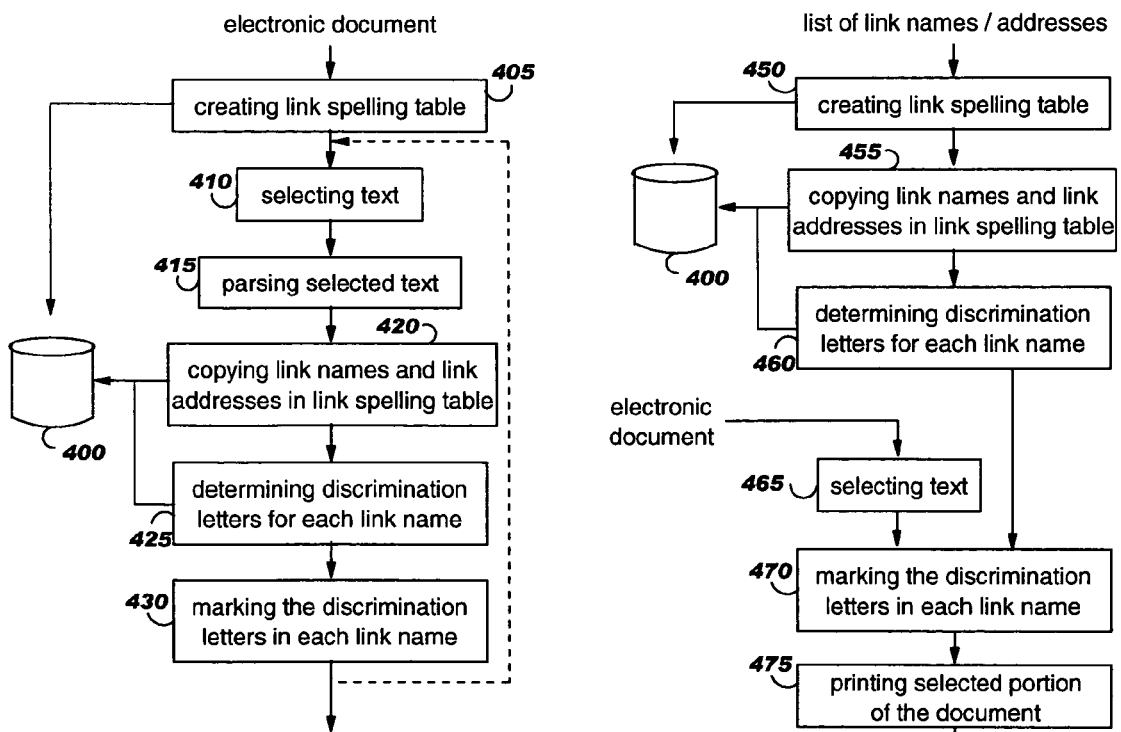
Figure 4a
Figure 4b

METHOD AND SYSTEMS FOR ACCESSING DATA BY SPELLING DISCRIMINATION LETTERS OF LINK NAMES

FIELD OF THE INVENTION

The present invention relates generally to the field of interactive hypermedia systems and data access systems, and more specifically to method and systems for accessing electronic data linked to a electronic or printed document by spelling discrimination letters of the link names, or hyperlinks, marked on this document.

BACKGROUND OF THE INVENTION

Even if the enthusiasm of the public for computer-based multimedia information has been considered by many analysts as a threat to the conventional forms of hard-copied publishing, reading paper cannot be compared with reading an electronic media. Although many electronic document systems, e.g., Web browsers or e-books readers, attempt to replace paper and printed publications, experience shows that reading paper remains preferable, whether the readers are familiar with computers or not. For most people, paper has a number of advantages: paper publications are easy to read, to mark, and to manipulate. Paper publications are familiar, portable and easily shared and distributed. Herein are given several publications comparing electronic documents versus printed documents, for example, J. Jacobson, B. Comiskey, C. Turner, J. Albert, and P. Tsao of the MIT Media Laboratory, "The Last Book", IBM Systems Journal, Vol 36, No. 3, 1997; and Michael D. Levi, "Literature at the Human-Computer Seam", presented at the Modern Language Association 2000 Annual Convention, on http://www.bls.gov/ore/htm_papers/st000100.htm.

With the development of electronic documents, a new mechanism for linking data resources has appeared: hyperlinks. A hyperlink is defined as a "[t]ext or graphical image associated with a URL such that when the user clicks on it, the browser displays the page at that location". Hyperlinks simplify the navigation among many and large electronic documents by providing a one-click selection mechanism. In view of the hyperlink's efficiency, modified versions have been developed for printed documents, e.g., U.S. Pat. No. 6,771,283 entitled METHOD AND SYSTEM FOR ACCESSING INTERACTIVE MULTIMEDIA INFORMATION OR SERVICES BY TOUCHING HIGHLIGHTED ITEMS ON PHYSICAL DOCUMENTS to Carro dated 3 Aug. 2004.

Given the ease to access the Internet, anywhere and anytime, and the amount of information available on the Internet, the interface that gives direct and/or simple access to specific information becomes a key factor to provide valuable information. The traditional interface of personal computers based on the combination of the screen, the keyboard, and a pointer such as a mouse, allows relatively fast and efficient access to the desired information on the Internet. It becomes more problematic, however, for mobile computers, wearable computers, handheld devices, and the likes, that have reduced screens, miniaturized keyboards and basic selection mechanisms, or none at all. Such selection mechanisms include miniaturized mouses or sensor pads with a pointing stylus combined with light beams to move a cursor on the smaller screens. The tedious process of pointing on a small screen or typing data on a miniaturized keyboard limits the ability to enter information through small display screens and portable keyboards, and this limitation can be crippling for persons who are physically challenged, or have a limited range of movement because of age or arthritis.

The development of speech recognition technology has opened up a new era of man-machine interaction. A speech user interface and automatic speech recognition (ASR) provides a convenient and highly natural method of data exchange between a user and a computer, particularly mobile or handheld computer. For example, U.S. Pat. No. 6,101,472 entitled DATA PROCESSING SYSTEM AND METHOD FOR NAVIGATING A NETWORK USING A VOICE COMMAND to Giangarra et al. dated 8 Aug. 2000, discloses a voice command interface which allows a user to merely speak the name of a link to receive the desired corresponding web page from a communication network, such as the Internet. During operation, a client computer accesses a current web page from a server. When a new web page is accessed, a processing unit in the data processing system provides control signals to a speech recognition unit to clear a vocabulary list currently stored within the speech recognition unit. Subsequently, the processing unit commences to parse the HTML source code of the accessed web page. The processing unit then determines whether the accessed web page has any links therein. If hyperlinks are embedded within the web page, the processing unit detects those hyperlinks during a parsing operation and enables the speech recognition unit to store the text displayed to an external user which corresponds to the link in a special vocabulary list of the speech recognition unit. A user is then able to provide a voice command to access the link by speaking the text stored within the special vocabulary list. Upon speaking that text, the processing unit accesses a web page corresponding to the link identified by the text.

In FIG. 1, the prior art shows a user 100 pronouncing a link name written in a document 105 displayed on the screen of a handheld device 110. Alternatively, the user 100 can spell the letters. For sake of illustration, the link name is "AGAMEMNON". The pronunciation of the word "Agamemnon" or, alternatively, its spelling is analyzed by a speech recognition engine of the handheld device 110. When the link name is recovered, the corresponding data are accessed through the network 115 to which the handheld device 110 is connected, and displayed on the handheld device 110. Alternatively, the accessed data can be "read" by the handheld device 110 using a text-to-speech synthesis software. The connection between the handheld device 110 and the network 115 can be of any type, including but not limited to a wide area network, local area network, wire connection, wireless connection, etc.

Speech recognition is the process by which an acoustic signal received by a microphone is converted to a set of text words. Speech recognition involves software and hardware that cooperate to audibly detect human speech and translate the detected speech into a string of words. Speech recognition works by breaking down sounds detected by hardware into smaller, non-divisible sounds, called phonemes i.e., distinct units of sound. The speech recognition software attempts to match the detected phonemes with known words from a stored vocabulary. In most cases, successful conversion of acoustic signals must be based upon an existing vocabulary of known words. Once recognized, words may then be used in a variety of computer software applications for purposes such as document preparation, data entry, or command and control.

Even for limited vocabularies, traditional speech recognizers use complex algorithms which in turn need large storage systems and/or dedicated Digital Signal Processors (DSP) with high performance computers. Because of memory limitations and system processing requirements, in conjunction with power consumption limitations, embedded or local speech recognition engines provide recognition to only a fraction of the audio inputs recognizable by a host, network-based speech recognition engine. ASR implemented on wearable, miniaturized, handheld computing devices generally cannot recognize speaker independent, continuous speech in real-time. It is not always feasible to predict every word which can be possibly spoken by a user of a speech-enabled system and furthermore, the speech recognizer must deal with environment noise e.g., environment wherein several persons are speaking simultaneously. Finally, there is a great variability in how different speakers pronounce words, as well as a variability in how an individual speaker pronounces words from one time to another.

To reduce such variability another approach requires that each word to be recognized be spelled aloud. Despite the possibility of specifying words by spelling, there are drawbacks such as the number of letters to spell. Spelling long words is tedious for the user and prone to errors. The presence of "confusable" letters on spelled words, such as clearly elucidating the differences between "p" and "t" and "d", etc., also introduces errors. As a consequence, there is a need for an efficient method and system that facilitate access to electronic data from a marked link in electronic and/or printed documents. The widespread use of the Internet and mobile communications offer new opportunities to combine electronic and printed media, in other words to create "media-adaptive multimedia" products. The philosophy behind the concept of media-adaptive multimedia is that information must be transferred to users in a form adapted to their needs. In fact, traditionally printed documents, digitally printed documents and multimedia products must be complementary. The different components must be combined depending on the user's needs. To facilitate this evolution, the electronic content should be accessible directly from the printed medium. Thus, there is an additional need in the industry to provide a method and system to improve access to information resources available on networks such as the Internet through reduced audio commands. The method and system should also distinguish the information resource available on networks such as the Internet from electronic and/or printed documents, and improve access to information linked to electronic and/or printed document using spelling discrimination audio commands.

SUMMARY OF THE INVENTION

These and other related objects are achieved by a method for creating a link spelling table associated to a set of hyperlinks; the method comprises the steps of selecting at least a portion of a text having the set of hyperlink embedded within. The method may identify the hyperlinks of the selected text portion, create a link spelling table, determine a set of discrimination letter subsets characterizing each of said identified hyperlink; and associate each discrimination letter subset to the address of the corresponding hyperlink in said link spelling table.

In addition, the method may determine the address of an hyperlink having a subset of discrimination letters stored in an associated link spelling table according to the previous method, comprising the steps of: receiving an audio signal representing a discrimination letter subset and extracting the discrimination letter subset; accessing the link spelling table associated to the hyperlink; determining if the extracted discrimination letter subset belongs to the link spelling table; and, if so, then extracting the address associated to the extracted discrimination letter subset.

Further advantages of the present invention will become apparent to the ones skilled in the art upon examination of the drawings and detailed description. It is intended that any additional advantages be incorporated herein.

BRIEF DESCRIPTION OF THE DRAWINGS

FIG. 1 is a simplified illustration of the prior art showing a user accessing information through Internet using a speech recognition based interface.

FIG. 2 is a simplified block diagram of a generic computer device in which an embodiment of the spelling discrimination access system and method can be implemented.

FIG. 3 depicts an electronic document comprising links to other documents that can be used in accordance with an embodiment of the invention.

FIGS. 4a and 4b are simplified flow charts of a method for creating link spelling tables and for marking discrimination letters on the link names for electronic documents and for printed documents, respectively in accordance with an embodiment of the invention.

FIG. 6 is an illustration of a link spelling table once the discrimination letters have been determined in accordance with an embodiment of the invention.

DETAILED DESCRIPTION OF THE PREFERRED EMBODIMENT

Figure 5:
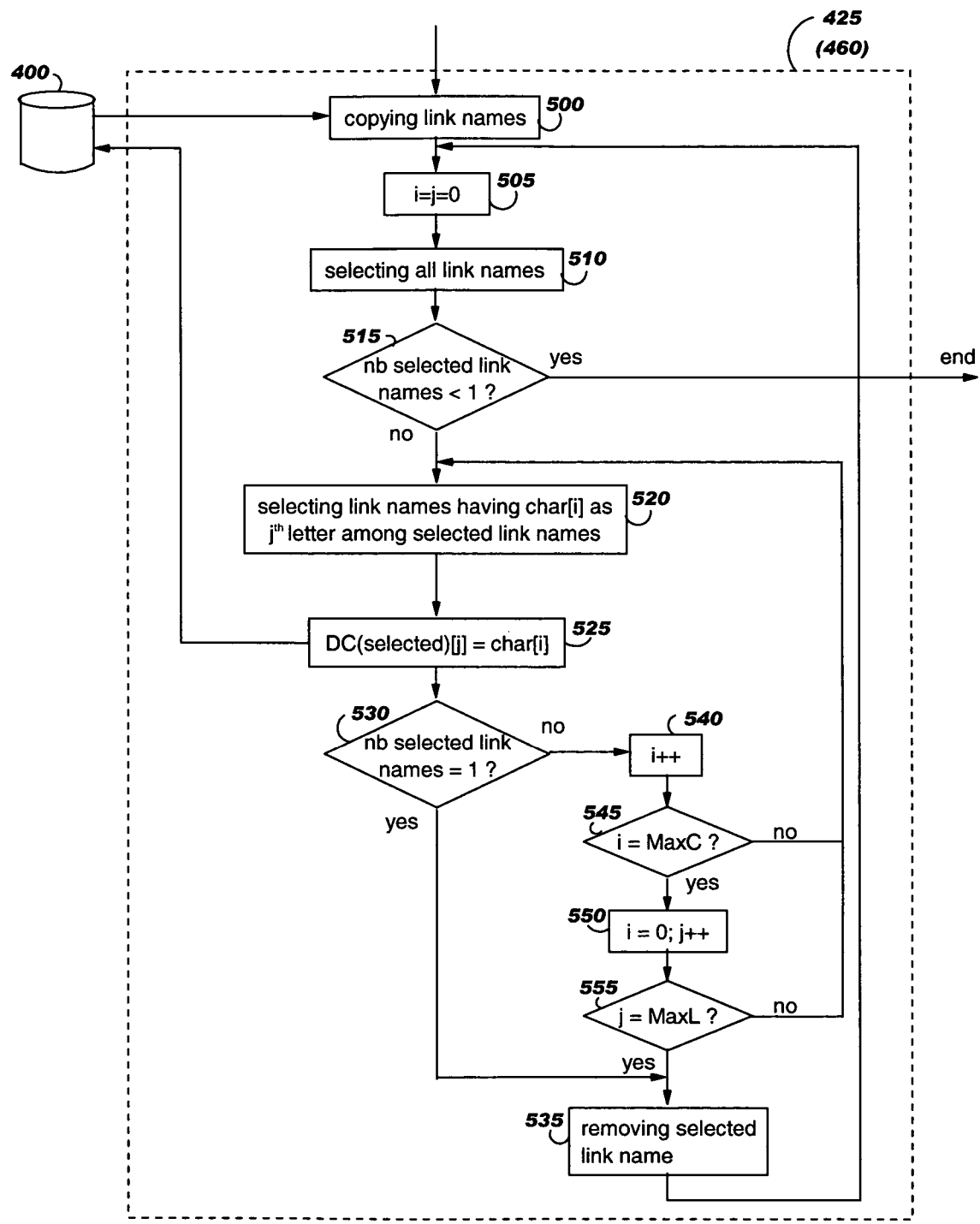
FIG. 5 is a simplified flow chart of a method to determine the subsets of discrimination letters in accordance with an embodiment of the invention.

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment, or an embodiment combining software and hardware aspects all generally referred to herein as a "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program source code for carrying out operations of the present invention are preferably written in an object oriented programming language such as JAVA, SMALLTALK or C++. The program object code may execute entirely on a server processing device, partly on a server processing device, as a stand-alone software package, partly on a client processing device, entirely on a client processing device, partly on a remote computer or entirely on the remote computer. In the latter scenario, the remote computer may be connected to the client or server processing device through a local area network (LAN) or a wide area network (WAN), or the connection may be made to an external computer via the Internet using an Internet Service Provider.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processing device of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing device to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing device to cause a series of operational steps to be performed on the computer or other programmable apparatus to produce a computer implemented process such that the instructions which execute on the computer or other programmable processing device provide steps for implementing the functions/acts specified in the flowchart and/or block diagram block or blocks.

The invention is equally applicable to any microprocessing device having an operating system in which the microprocessor or processing device is connected across a network to devices having the same or different operating systems. In general, the routines executed to implement the embodiments of the invention, whether implemented as part of an operating system or a specific application, component, program, object, module or sequence of instructions will be referred to herein as computer programs or simply programs. The computer programs typically comprise one or more instructions that are resident at various times in various memory and storage in a device and that, when read and executed by one or more processors in a device, cause that device to perform the steps necessary to execute steps or elements embodying the various aspects of the invention.

A method for determining subsets of discrimination letters of link references, or link names, and for marking such link references is provided. Also a method for retrieving information by spelling discrimination letters of the link references is also disclosed herein. In brief, an embodiment of the invention herein determines and highlights a subset of discrimination characters for each hyperlink of the electronic or printed document part so that the hyperlink is activated when the corresponding subset of discrimination characters is spelled by the user. Activating a hyperlink means retrieving the data stored at the address defined in the hyperlink. A link spelling table stores each discrimination character subset and its corresponding link address. Depending upon the document type, the link spelling table may dynamic. For printed documents, the link spelling tables may be created when the documents are setup or printed. A link spelling table can be created for each page, for a plurality of pages such as chapter, or for the whole document. For electronic documents displayed on a computer screen, a handheld device screen, a mobile phone display, a television screen, or other electronic screen, the link spelling tables may be created when the document is displayed, for the visible part of the document, and dynamically maintained as the document is moved or scrolled.

FIG. 2 illustrates a block diagram of a generic computer device, handheld device, or any kind of microprocessing device connected to a network, generally referred to as computer 200, in which the present invention can be implemented. The system has a central processing unit (CPU) 205, a read-only memory (ROM) 210, a random access memory (RAM) 215, and an input/output (I/O) subsystem 220, all connected to a system bus 225. The I/O subsystem 220 may include one or more controllers for I/O devices such as keyboard 230, cursor control device 235, display device 240, digital signal processing (DSP) unit 245 that can be connected to a microphone 250, mass storage device 255, and network interface 260. Depending upon the application of the system 200, one or more further I/O devices may be connected to the I/O subsystem 220. Typically, the hardware system 200 is controlled by an operating system that can be stored in ROM 210 or in mass storage device 255, which in turn controls various tools and applications that are generally loaded in RAM 215. Microphone 250 can be used for capturing utterances pronounced by a user and DSP 245 can be used to process and convert the utterances, received from the microphone 250, to phonemes. Because the system of the invention is based upon voice control, keyboard 230 is not required or its use can be reduced.

A method to create link spelling tables of electronic documents such as web pages and to mark discrimination letters in the link names is a component of an embodiment of the invention described herein. FIG. 3 may be a screen shot of a standard electronic document 300 comprising links to other electronic documents. For sake of illustration, links 305 are highlighted using underlined characters, however, the links may be identified by using a dedicated font color or any other distinguishing marking. The address of the electronic document associated to each link, e.g., address 310 corresponding to link 305, is generally coded in the source of the electronic document with the corresponding link name. For example, using hypertext markup language (HTML), the address of a link can be set using the address element of metadata (<a href="Link-address">Link-name</a>), like: <a href="http://homepage.mac.com/cparada/GML/Agamemnon.html">Agamemnon</a>. Analyzing the content of a source document allows the determination of its links and of the corresponding addresses.

FIG. 4a provides a simplified flow chart of a method in accordance with an embodiment of the invention that creates link spelling tables of electronic documents such as web pages, and marks discrimination letters in the link names. When the application receives an electronic document, it creates and initializes a link spelling table 400 associated to this electronic document as in step 405. In step 410, a text portion of the document is selected. Preferably, the selected text portion is the text portion that is displayed on the display device. The selected text portion is parsed in step 415 and all the link names are extracted. The corresponding link addresses are stored in the link spelling table 400 in step 420. Note that it is not required to store the link names in the link spelling table 400 if the discrimination letters are marked in the document when they are determined. In this case, only the subsets of discrimination letters that characterize the link names and the link addresses are stored in link spelling table 400. When the link names are identified, the application determines a subset of discrimination letters for each link name in step 425. The determined subset of discrimination letters are stored and associated with the corresponding link addresses in the link spelling table 400. Then, the discrimination letters are marked on the displayed electronic document in step 430. As mentioned above, marking may comprise displaying the letters with an underlined font or with a specific color. If a letter belonging to a subset of discrimination letters appears several times in the corresponding link name, the letter marked in the link name is determined by the spelling order set during the determination step 425.

FIG. 5 illustrates a method to determine the subsets of discrimination letters. After having copied the list of link names in a temporary link name list in step 500 from the link spelling table 400, variables i and j are initialized, e.g., variables i and j may be set to zero, as in step 505. Variable j represents a letter position in a link name, that is, the position of a particular letter starting from the first character. Variable i represents an index used to determine a letter according to the alphabet used for coding the link names, e.g., char[1]="a", char[2]="b", char[3]="c", and so on, char being a string of all the possible characters. All the link names of the temporary link name list are selected in step 510 and the process then determines if the number of selected link names is less than one, as in step 515. If the number of selected link names is less than one, the process stops. If, however, the number of selected link names is equal to or greater than one, the link names having char[i] as $j^{th}$ letter are selected among the set of selected link names. In other words, the link names whose $j^{th}$ letter is different than char[i] are deselected, shown in step 520. Then, char[i] is stored as a discrimination letter in link spelling table 400 for selected link names, step 525. Discrimination letters may be stored sequentially in association to each corresponding link names. Then, in step 530, the process determines if the number of selected link names is equal to one. If so, the selected link name is removed from the temporary link name list in step 535 and the process branches to step 505 in order to determine discrimination letters of remaining link names. If, however, the number of selected link names is not equal to one, variable i is incremented by one in step 540, and in step 545, the variable i is compared with a value MaxC that represents the number of different letters of the alphabet used to encode the link names. For example, using a standard alphabet without symbols such as comma, MaxC is equal to 26. If variable i is different than MaxC, the process branches to step 520 to refine the selection of link names. If the variable i is equal to MaxC, then it, i.e., variable i, is set to zero and now variable j is incremented by one in step 550. The process then compares variable j with a value MaxL that represents the length of the longer link name in step 555. If variable j is different than MaxL, the selection of link names is refined as in step 520. If, however, variable j is equal to MaxL, all selected link names are removed from the temporary link name list in step 535 and discrimination letters of remaining link names are determined as in step 505. For sake of clarity, the example illustrated above is simplified. Preferably, the step of determining the discrimination letter should address the number of discrimination letters and of the pronunciation similarity of letters. To optimize, e.g., to reduce, the number of discrimination letters, an optimization algorithm such as simulated annealing may be used. Likewise, to optimize the choice of discrimination letters, a table indicating the pronunciation similarity degree between each letter couple may be used.

FIG. 6 illustrates the content of a link spelling table 400 once the discrimination letters have been determined. Link spelling table 400 may comprise more or less than the three columns 600, 605, and 610 shown. The embodiment of three columns illustrate a link name, the corresponding discrimination letters, and the corresponding address, respectively. For example, row 615 stores the link name Aeneas that discrimination letters are AE and the corresponding address is http://www.pantheon.org/articles/a/aeneas.html. When the printed document derives from an electronic document having embedded links as the one shown on FIG. 3, the method to create link spelling tables of printed documents and for marking discrimination letters in the link names may comprise an additional step of printing the selected text.

Sometimes, however, the printed document derives from an electronic document that does not comprise embedded links, e.g., a scanned document, which is common, the algorithm for creating the link spelling table and for marking discrimination letters on the link names may use a list of link names from a different source, or different file. FIG. 4b provides a simplified flow chart of a method of the invention for creating link spelling tables of printed documents and for marking discrimination letters in the link names when the list of link names and the corresponding addressed cannot be derived from the electronic document. When the application receives the list of link names and associated addresses, it creates and initializes a link spelling table 400 as in step 450 wherein the link names and corresponding link addresses are stored, such as shown in step 455. Then, the application determines a subset of discrimination letters for each link name in step 460 according to the method described above in FIG. 5. The determined subset of discrimination letters are stored and associated with the corresponding link addresses in the link spelling table 400. Then, the electronic document and a selected portion of the document are received as in step 465 and the link names of the document selected portion are identified and the discrimination letters are marked using a particular font or attributes, such as underlining or coloring, in step 470 and the selected part of the document is printed is step 470.

Figure 7:
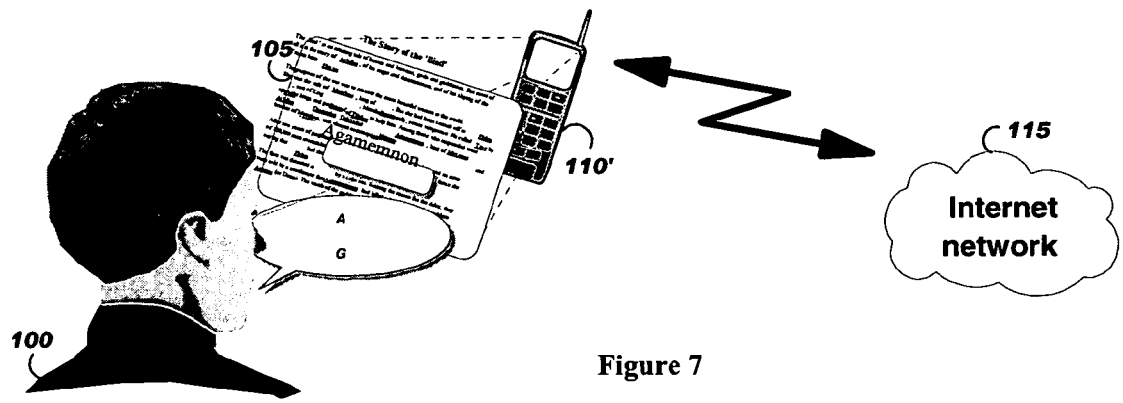
FIG. 7 is a simplified illustration of an environment to access information through the Internet using a speech recognition based interface and discrimination letters in accordance with an embodiment of the invention.

To understand the method to trigger links by spelling discrimination letters marked on the link names, reference is made to FIG. 7 illustrating a user 100 pronouncing the discrimination letters of a link name written in a document 105 displayed on the screen of a handheld device 110'. Note that document 105 may also be a printed document. The pronunciation of the letters A and G is analyzed by a speech recognition engine of the handheld device 110'. When the discrimination letters are recovered, the corresponding address is found in the link spelling table in order to access the corresponding data through the network 115 to which the handheld device 110' is connected. These data are displayed on the handheld device 110'. Alternatively, the accessed data can be "read" by the handheld device 110' using a text-to-speech synthesis software. As mentioned above, the connection between the handheld device 110' and the network 115 can be of any type including but not limited to a wide area network, local area network, wire connection, wireless connection, etc.

Figure 8:
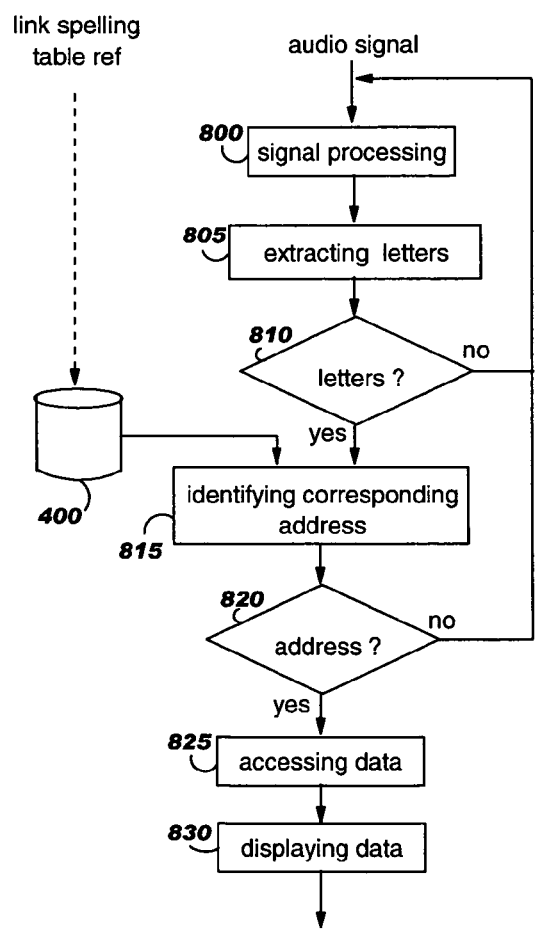
FIG. 8 is a simplified flow chart of a method to trigger links by spelling discrimination letters marked on the link names of a document in accordance with features of the invention.

FIG. 8 illustrates an example of a method to trigger links by spelling discrimination letters marked in the link names of a document. The voice of a user is received by the system as an audio signal that is converted into an electrical signal that is preferably preprocessed to remove noise and then normalized in step 800 before being analyzed for extracting the spelled letters, as in step 805. A test is performed to determine whether or not the system has extracted characters in step 810. If the signal does not comprise any distinguishable letters, the application waits for the next audio signal. But if at least one character has been identified, the system compares this identified character with the discrimination letters of the selected link spelling table 400 in step 815. The selected link spelling table 400 may be the current one corresponding to the current displayed electronic document or another link spelling table previously stored on the device running the application that user has given the reference corresponding to the document he/she is reading. The process then determines, in step 820, if an address is associated to the extracted letters. If no address is associated to the extracted letters, the process will wait for the next audio signal. If, however, an address is associated to the extracted letters, the system accesses the corresponding data in step 825, through a network or locally on the computer running the application. The system then displays the accessed data in step 830.

Figure 9:
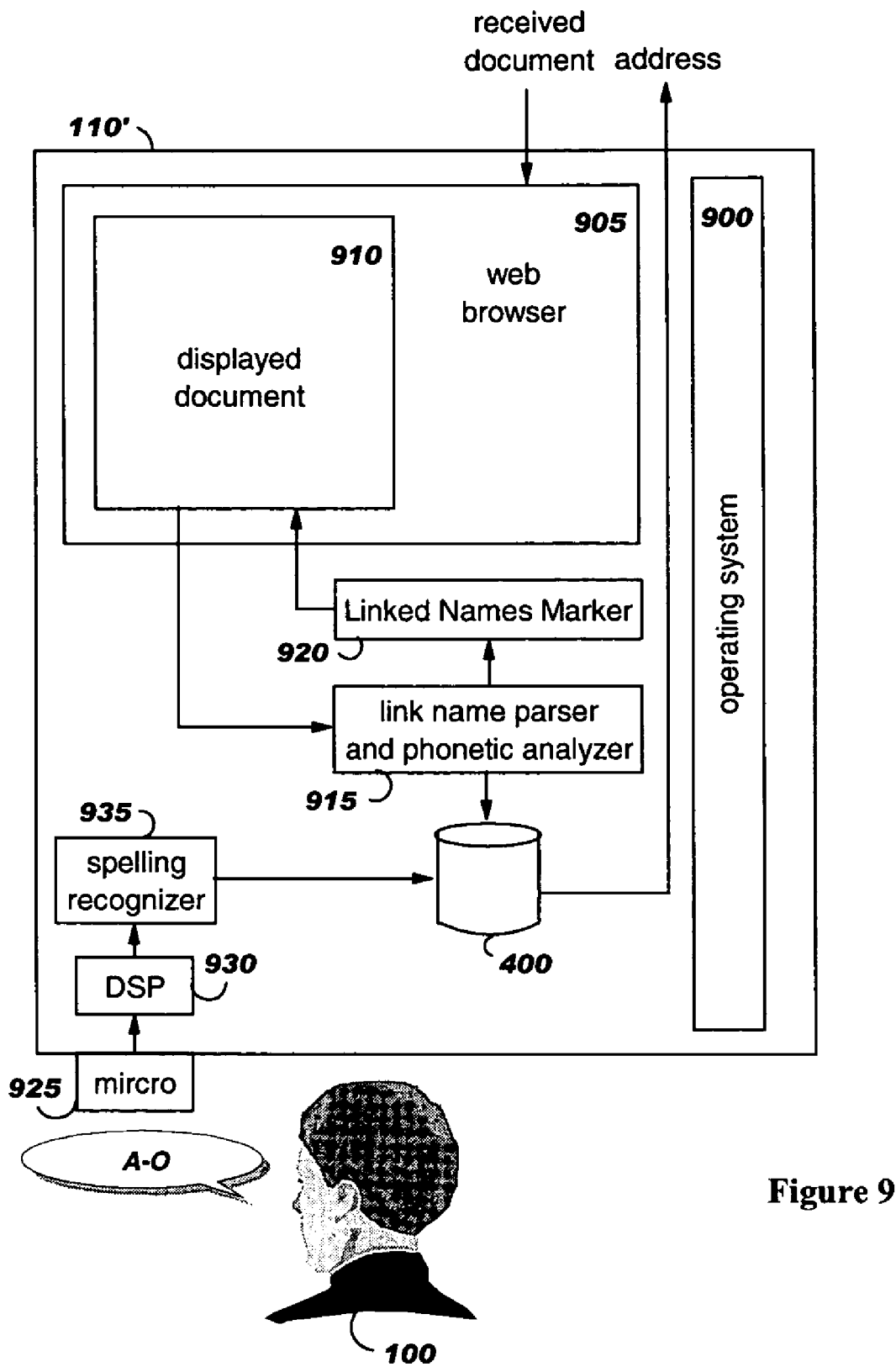
FIG. 9 is a simplified block diagram of a handheld device implementing an embodiment of the invention.

FIG. 9 provides a simplified block diagram of a handheld device 110' implementing an embodiment of the methods described herein. The handheld device 110' preferably comprises an operating system 900 and a web browser 905 adapted for displaying a document 910. When the document 910 is displayed, the web browser launches a link name parser module 915, preferably coupled with a phonetic analyzer, that determines the discrimination letters of the link names embedded within the displayed document 910 and stores the discrimination letters with the associated addresses in the link spelling table 400. The link name parser module 915 launches a link name marker 920 that marks the determined discrimination letters in the link names of the displayed document 910. When the user 100 spells letters, the audio signal is converted into an electrical signal by a microphone 925. The electrical signal is preferably transferred to a digital signal processor 930 (DSP) for preprocessing as described above. Then a spelling recognizer extracts the letters that are compared with the ones stored in the link spelling table 400. If an address corresponds to the extracted letters, the address is used to access the corresponding data. For example, such address can be transferred over Internet by the web browser 905 that in turn, receives a document that can be displayed. At this stage, the link spelling table can be erased by a new one comprising the link name discrimination letters of the received document.

In one embodiment, it is assumed that speech comes from a local microphone but it is understood that the sounds may come from a remote sensor e.g., through a telephone or other speaker. Likewise, all the processing can be done locally on the user's device or on a remote device e.g., a network server. For example, the user's device can transmit the reference of a document to a remote server that determines the discrimination letters of the embedded links. The document and the set of discrimination letters, or the document wherein the discrimination letters are marked, are transmitted back to the user's device, to be displayed. For accessing a marked link, the user's device can transmit the reference of an electronic document, or a printed document, and a sound, or a preprocessed sound. The sound, or the preprocessed sound, can be processed by the server and compared with the discrimination letters of the link spelling table that can be stored locally in the server. After having determined the address corresponding to the link associated to the pronounced discrimination letters, the server accesses the corresponding data and transmits it to the user's device.

Many advantages are provided by the method and systems of the invention including: increasing the accuracy of the voice system for accessing link; improving the device interface by simplifying the control commands. Naturally, in order to satisfy local and specific requirements, a person skilled in the art may apply to the solution described above many modifications and alterations all of which, however, are included within the scope of protection of the invention as defined by the following claims.

What is claimed is:

1. A method for creating a link spelling table associated with a set of hyperlinks, comprising the steps of:
    selecting a word displayed on a webpage, the word having at least one hyperlink, the word not displayed a URL or address of the at least one hyperlink;
    identifying the at least one hyperlink from the displayed word;
    creating a link spelling table;
    parsing a plurality of characters of the displayed word having the at least one hyperlink to determine a discrimination letter subset comprising less than all the plurality of characters of the displayed word having the at least one hyperlink, wherein the step of parsing the displayed word further comprises applying one or more optimization algorithms to reduce the number and the pronunciation similarity of characters in the discrimination letter subset; and
    associating each discrimination letter subset to an address of its respective at least one hyperlink in the link spelling table.

2. The method of claim 1, further comprising the step of marking each discrimination letter subset in the displayed word associated with each of the at least one hyperlink.

3. The method of claim 2, further comprising the step of displaying the marked discrimination letter subset in the displayed word.

4. The method of claim 2, further comprising the step of printing the marked discrimination letter subset of the displayed word.

5. The method of claim 1, further comprising receiving an audio signal representing the discrimination letter subset.

6. The method of claim 1, further comprising determining an address of each respective at least one hyperlink.

7. The method of claim 6, further comprising accessing data localized at the address of the at least one hyperlink.

8. The method of claim 7, further comprising displaying data accessed from the address of the at least one hyperlink.

9. The method of claim 1, wherein the step of identifying the at least one hyperlink of the selected text portion comprises:
    parsing a hyperlink list;
    comparing the parsed hyperlink list with the discrimination letter subset of the displayed word.

10. A data processing system, comprising:
    at least one processing device connected to at least one memory and a display to display text having at least one hyperlink, the text not being an address of the hyperlink;
    a selector component executable in at least one processing device to select a word of the displayed text;
    an extractor component executable in at least one processing device to extract at least one hyperlink from the selected word;
    a parser component executable in at least one processing device to parse each character of the selected word to determine a subset having less than all the characters of the selected word to identify the at least one extracted hyperlink;
    an optimization component executable in at least one processing device to reduce the number and pronunciation similarity of the characters in the subset;
    a link spelling table stored in the memory accessible by at least one processing device in which to store the subset of characters of the word identifying its respective at least one extracted hyperlink; and an associator component executable in at least one processing device that correlates each subset of characters to an address of its respective at least one extracted hyperlink.

11. The data processing system of claim 10, wherein the system further comprises:
   a microphone or other audio system input connected to the at least one processing device:
   a voice recognition application executable in the at least one processing device by which to recognize and parse any audio signals input into the microphone or other audio system input.

12. The processing system of claim 10, wherein the system is distributed across a network of a plurality of processing devices.

13. The data processing system of claim 12, wherein the link spelling table in located on a different processing device than the processing device upon which said parser component is executing.

14. The data processing system of claim 12, wherein one of the processing devices is a handheld device and the display is a visual display of the handheld device.

15. A computer program product embodied in a computer-readable storage medium, for creating a spelling link table in a processing device, comprising:
   instructions for reading text having at least one hyperlink, the text not being an address of the at least one hyperlink;
   instructions for selecting a word of the text having the at least one hyperlink;
   instructions for identifying the at least one hyperlink;
   instructions to determine a discrimination letter subset comprising less than all the characters of the selected word by analyzing each character of the word and reducing the number and pronunciation similarity of characters in the discrimination letter subset;
   instructions to mark each discrimination letter subset;
   instructions to create a link spelling table;
   instructions to store each discrimination letter subset in the link spelling table;
   instructions to associate each discrimination letter subset to an address of its respective at least one hyperlink;
   instructions to correlate the at least one hyperlink based on the spelling of its respective discrimination letter subset; and
   instructions to retrieve data from the address of the hyperlink based upon the spelling of its respective discrimination letter subset.

16. The computer program product embodied in a computer-readable storage medium of claim 15, further comprising instructions for displaying the discrimination letter subset of the selected word corresponding to each identified at least one hyperlink.

17. The computer program product embodied in a computer-readable storage medium of claim 15, further comprising instructions for printing the discrimination letter subset of the selected word corresponding to each identified at least one hyperlink.

18. The computer program product embodied in a computer-readable storage medium of claim 15, having the link spelling table with which to access a network to retrieve additional data associated with the at least one hyperlink within the text.

19. A service method to provide a link spelling table, comprising:
   inputting text having at least one word, the word having a hyperlink but the word not being an address of the hyperlink;
   identifying the hyperlink by one of two methods: either parsing the hyperlink, or parsing the word and comparing the parsed word with a table of preexisting hyperlinks;
   for each identified hyperlink, determining a set of discrimination letter subsets comprising less than all characters in the word having the identified hyperlink, the characters of each respective discrimination letter subset selected to reduce the number of and pronunciation similarity between each character;
   storing the discrimination letter subsets for each identified hyperlink in a link spelling table;
   associating an address of the hyperlink with its respective set of stored discrimination letter subsets;
   receiving an input from a user spelling all or a portion of the set of discrimination letter subsets; and
   retrieving data from the hyperlink's address associated with the set of discrimination letter subsets in the link spelling table based on the spelling.

* * * * *